United States Patent [19]

Janak et al.

[11] 4,325,090
[45] Apr. 13, 1982

[54] DEVICE FOR SYNCHRONIZING A CLOCK PULSE GENERATOR WITH A SERIAL DATA SIGNAL

[75] Inventors: Miloslav Janak, Sunnyvale, Calif.; Martin Ginsberg, Daaden; Albrecht Reiners, Siegen, both of Fed. Rep. of Germany

[73] Assignee: U.S. Philips Corporation, New York, N.Y.

[21] Appl. No.: 141,715

[22] Filed: Apr. 18, 1980

[30] Foreign Application Priority Data

Feb. 17, 1979 [DE] Fed. Rep. of Germany ....... 2906200

[51] Int. Cl.³ .............................................. G11B 5/09
[52] U.S. Cl. .................................................... 360/51
[58] Field of Search ....................... 360/39, 40, 43, 42, 360/51

[56] References Cited

U.S. PATENT DOCUMENTS 3,810,234  5/1974  Monett .................................. 360/51
4,003,086  1/1977  Larsen et al. ......................... 360/51

*Primary Examiner*—Vincent P. Canney
*Attorney, Agent, or Firm*—Jack E. Haken

[57] ABSTRACT

During the reading of serial data signals, for example, from a so-termed magnetic floppy disc, a synchronized condition between the local oscillator of the reading device and the timing of the data stream must be reached as quickly as possible after the start of the read operation. When the initial synchronization has been reached, readjustment of phase and frequency may take place only slowly, because the instants at which the actual signal transitions occur may exhibit a large spread with respect to the nominal instants. Therefore, during a synchronization operation an element of a read clock pulse train is applied to the phase comparator at each status transition of the medium as well as at further instants. The data sample signal of the clock pulse generator is applied at twice the bit frequency to the other input of the phase comparator. As a result, during the synchronization operation the phase comparison is performed in a dense series, so that the low-pass filter connected to the output of the phase comparator may have a high cut-off frequency. Once the synchronization has been realized, the phase comparison is performed only once per data bit and, the low-pass filter is switched over to a lower cut-off frequency.

5 Claims, 5 Drawing Figures

DEVICE FOR SYNCHRONIZING A CLOCK PULSE GENERATOR WITH A SERIAL DATA SIGNAL

BACKGROUND OF THE INVENTION

The invention relates to a device for synchronizing a clock pulse generator with a serial, electrically bivalent signal which can be received from an external medium and which comprises a number of successive bit cells of mutually nominally equal time length with at least one signal transition in each series of a predetermined, fixed number of directly successive bit cells, said device furthermore comprising:
(a) an oscillator with a control input for producing a control clock pulse train under the influence of a signal on the control input;
(b) a clock extraction device for producing a read clock pulse train from a signal derived from said medium;
(c) a phase comparator for receiving said control clock pulse train and said read clock pulse train and for supplying a phase difference signal;
(d) a low-pass filter for receiving said phase difference signal and for forming therefrom a control signal for said control input.

A device of this kind is known from U.S. Pat. No. 3,646,520. The known device utilizes a magnetic disc which comprises, in addition to data tracks, a separate clock track. Thus, only phase differences between the clock pulses on the disc and the data bits can occur. According to the invention, however, data information and clock information are stored together in a single track. In attractive data code, each bit cell comprises a signal transition at the beginning of the bit cell if the information has a first value; the other information value is then represented by either a signal transition in the centre of the bit cell, or by the absence of a signal transition. For the regenerating of the information, it is then necessary to generate a control clock pulse train which samples each bit cell in both havles in order to enable decoding of both information values.

The data bits are stored in groups on such generally mechanically driven, magnetic media (record carriers); such a group is also referred to as a "sector" and each sector is often separately addressable. There are tolerances in the driving of the medium. Moreover, the individual sectors are not stored together; in many cases notably reading and rewriting of only selected sectors takes place. As a result, a transition from one sector to the next sector is usually accompanied by a frequency jump as well as by a phase jump. For realizing a suitable read facility, each sector contains an amount of synchronisation information at its beginning, said information preceding the actual data information and being used for readjustment of the clock pulse generator as regards phase as well as frequency. In order to minimize the space required, the physical length of the synchronisation information must be limited and, therefore, the readjustment of the clock pulse generator may require only little time. Therefore, the clock pulse generator must be capable of quickly changing the phase as well as the frequency.

On the other hand, the content of the actual data information is arbitrary. Therein, the signal transitions do not occur exactly at the beginning or the centre of a bit cell: these transitions may be shifted up to $\frac{1}{4}$ bit cell with respect to the nominal instant, it being possible for the shift to vary from one bit cell to another. The latter differences can be determined inter alia by the information content. These differences are such that, when averaged over a number of successive bit cells, they compensate for each other, i.e. the mean length of a bit cell is substantially constant. In order to enable correct reading of the information in spite of these differences, the sample frequency must be suitably constant: the adaptation to, for example, variations in the drive speed may only be effected slowly. The frequency of the clock pulse generator should then in principle be stable. Thus, a contradiction exists between the following two requirements:
(a) during the synchronisation operation, the frequency/phase of the clock pulse generator must be quickly adaptable;
(b) during the reading of the data information, the frequency should, in principle, be constant.

SUMMARY OF THE INVENTION

It is an object of the invention to provide a device of the kind set forth which requires only a short period of time for adjustment during the synchronisation operation, but which follows exclusively long-period variations of the bit cell frequency during the subsequent reading of the data information. The object in accordance with the invention is realized in that for use with a single, serial medium signal which may contain signal transitions at the beginning of a bit cell as well as at the centre of a bit cell in dependence of the data information contained therein, said device has a first and a second state, that is to say a first state for supplying, during a synchronisation operation and under the control of each signal transition of the medium signal, directly and also each time one half bit cell later, an element of said read clock pulse train (DC) from the clock extraction device to a first input of the phase comparator (11), a second input of the phase comparator being connected to an output of a clock control circuit (7) for receiving the control clock pulse train (CP) with a nominal frequency which amounts to twice the bit cell frequency, said low-pass filter (13) being adjusted to a first cut-off frequency, there being provided a test circuit (21) for detecting the bits of the medium sampled under the control of the control clock pulse train and for generating a synchronization signal (S), an output for said synchronization signal being connected to inputs of the clock extraction device as well as the clock pulse generator circuit (9) in order to activate said second state in which the clock extraction device as well as the pulse shaper circuit are adapted to generate, under the control of each signal transition of the medium signal, each time only a single element of the read clock pulse train or the control clock pulse train, said low-pass filter then being switched over to a second, lower cut-off frequency. During the synchronization operation in a device of this kind the signals occur on the output of the phase comparator at double the speed in order to provide, each time, an indication of the phase difference. As a result, the low-pass filter may have a higher cut-off frequency while still supplying a highly smoothed output signal for controlling, for example, the voltage-controlled oscillator circuit. As a result, the synchronization operation is accellerated, while in the synchronized condition only a slow frequency variation of the oscillator can take place due to the combination of the low cut-off frequency of the low-pass filter and the smaller number of phase comparisons.

During the synchronization operation, the elements of the read clock pulse train which have not been formed directly under the control of a signal transition of the medium signal need not arrive exactly one half effective bit cell later. It is most important that the phase comparison signals are frequently generated. Therefore said clock extraction device preferably comprises a clock input for receiving from said oscillator a second control clock pulse train (CL) having a nominal frequency which is higher than twice the bit cell frequency in order to form therefrom, in conjunction with a signal transition of the medium signal, an element of the read clock pulse train which is delayed with respect to this signal transition. If the frequency of the former control clock pulse train (CP) deviates from twice the bit cell frequency, the read clock pulses thus developed are not situated each time exactly one half bit cell from each other. However, as the synchronization operation progresses, this inaccuracy diminishes when the frequency of the control clock pulse train becomes better synchronized with the bit cell frequency. The synchronization operation is hardly delayed by this inaccuracy.

Preferably, the clock extraction device comprises a counter with a set input for being set, under the control of each signal transition in the medium signal, to a predetermined starting position in order to receive, as from said position, said second control clock pulse train as an advance signal and to supply a first signal value of said read clock pulse train until a predetermined maximum position is reached, and to supply subsequently a second signal value thereof, there being provided a blocking element for blocking said counter during said second state of the device after said predetermined position has been reached. If the difference between the counter positions corresponds, for example, to one quarter of the length of a bit cell and the phase comparator each time compares the end of an element of the read clock pulse train with a control clock pulse from the clock pulse generator, the latter signal can be used as a sample signal during the processing of the information signal.

If the low-pass filter of the device is formed by an RC-filter, the cut-off frequency of the low-pass filter is preferably switched over by switching an additional resistor on/off. The cut-off frequency can thus be readily changed. Preferably, said on/off switching is realized by means of an optical coupling element which is connected in series with the additional resistor. Said resistor can thus be readily switched without conductive connection. Instead, a field effect transistor can also be advantageously used.

BRIEF DESCRIPTION OF THE FIGURES

The invention will be described in detail hereinafter with reference to the accompanying diagrammatic drawings.

DETAILED DESCRIPTION OF A PREFERRED EMBODIMENT

Figure 1:
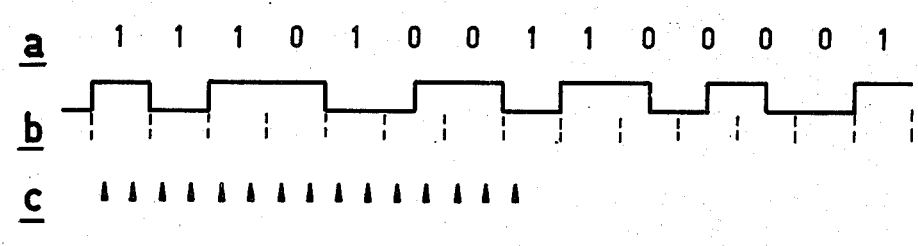
FIG. 1 shows, by way of example, some details of the information signal present on the medium.

FIG. 1 shows, by way of example, some details of the information signal present on the medium. a denotes the stored information in the form of a bit series. b denotes the pattern of the bivalent quantity of the medium in which said information is embodied, i.e. in the form in which it becomes available on the output of a reading element for digital processing by a user. Therefore, any integrating and differentiating effects in such a reading element have already been taken into account. Vertical interrupted lines denote the boundaries of the bit cells: each bit cell thus contains a data bit. A logic "1" is given by a signal transition at the beginning of a bit cell. A logic "0" is given by a transition at the centre of a bit cell. However, if a "0" is directly succeeded by a "1", the latter transition is omitted. c denotes the optimum sample instants for the signal at b. As a result of this set-up, a mutual shift of $\pm\frac{1}{4}$ bit cell can occur between the optimum and the actual sample instants, without errors being produced. On the other hand, the transitions may also be shifted $\pm\frac{1}{4}$ bit cell with respect to the nominal transition instants, without errors being produced. Similarly codes also exist which have the following properties in common:
 (a) per bit cell 2x sampling per bit cell in principle suffices for the detection of the associated information value;
 (b) signal transitions can occur at the beginning of the bit cell as well as at the centre thereof;
 (c) the time interval between two successive transitions is limited; in the above example, for example, to a maximum value of two bit cell periods.

Such codes also exist where 1x sampling per bit cell is sufficient for the reconstruction of the data information.

Figure 2:
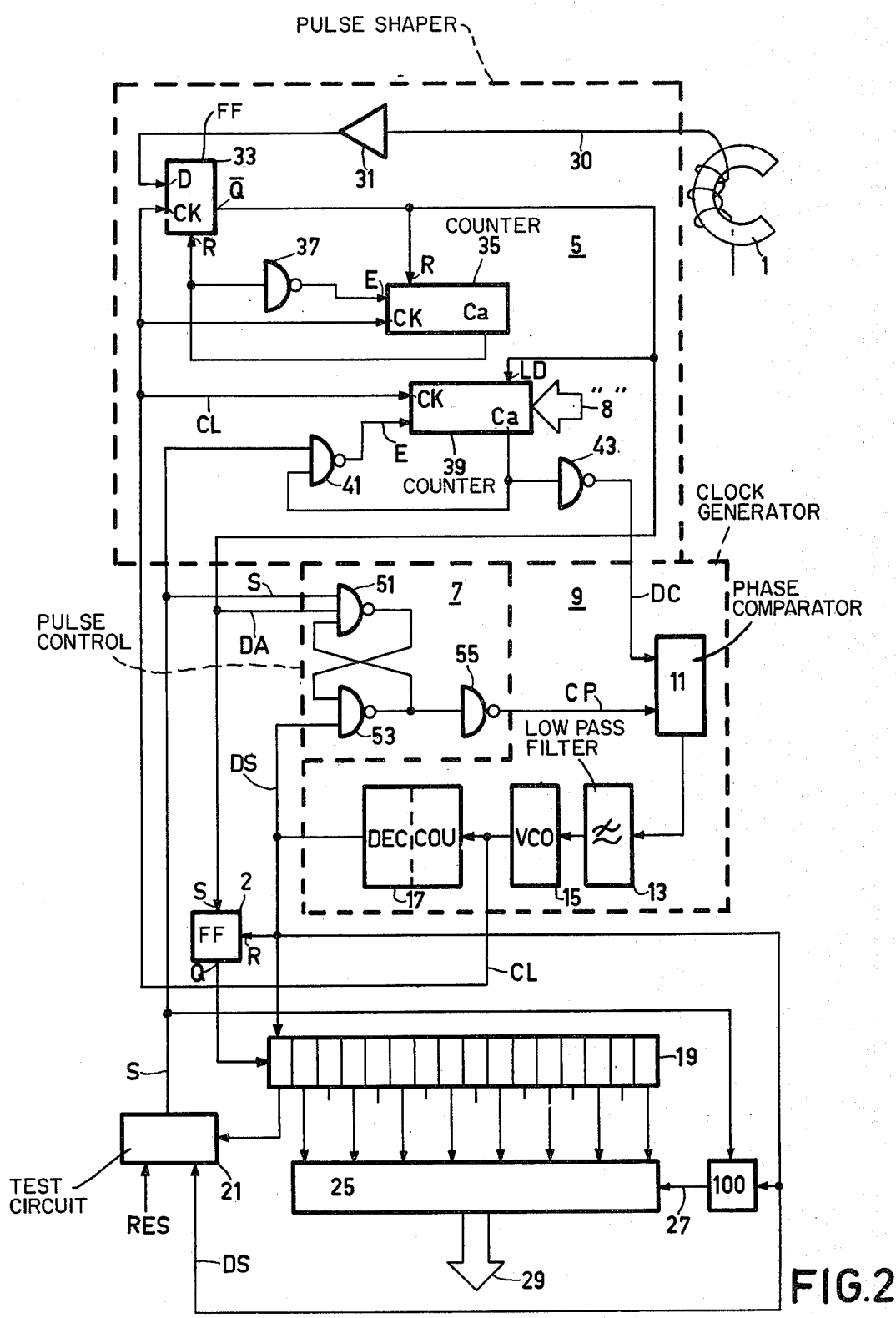
FIG. 2 shows a block diagram of a preferred embodiment in accordance with the invention.

FIG. 2 shows a block diagram of a preferred embodiment in accordance with the invention. The circuit comprises the following elements and subsystems: a read head 1, a pulse shaper circuit 5, a clock pulse generator circuit 9, a clock pulse control circuit 7, a shift register 19, a set/reset flipflop 2, a test circuit 21, and a parallel switch 25.

The pulse shaper circuit 5 comprises an amplifier 31, a data (D) flipflop 33, two inverters 37, 43, two counters 35, 39, and a logic NAND-gate 41.

The clock pulse generator circuit 9 comprises the following parts: a phase comparator 11, a low-pass filter 13, a voltage-controlled oscillator 15, and a counter-cum-decoder 17.

The clock pulse control circuit 7 comprises two logic NAND-gates 51, 53 and an inverter 55.

In the circuit of FIG. 2, the element 1 is a diagrammatically shown read head for a magnetic medium, for example, a so-called floppy disc, which can be mechanically driven along the read head. The medium has been omitted for the sake of brevity. The device for adjusting the read head and for keeping it adjusted to a given track of such a floppy disc does not form part of the invention. In the present embodiment, each bit cell nominally corresponds to an interval of 2 microseconds.

The signals arriving from the read head via the line 30 are applied, via the amplifier 31, to the D input of the flipflop 33. In the amplifier, the signals are amplified and limited, so that they have the correct values for the module 33 of the type SN 7474. The clock input CK receives clock pulses from the clock pulse generator circuit 9. As will be explained hereinafter, the pulse shaper circuit 5 generates, by means of the clock pulse series CL received from the clock pulse generator 9, a synchronized data signal on the line DA. Furthermore, the pulse shaper circuit 5 produces a read clock pulse train on the line DC so that it also acts as the clock extraction device. The line DC is connected to one of the inputs of the phase comparator 11 in the clock pulse generator circuit 9. The other input of the phase comparator 11 is connected to the line CP in order to receive a control clock pulse train from the clock pulse control circuit 7. The latter train is derived from an output signal of the clock pulse generator circuit 9, i.e. from the signal DS.

The output of the phase comparator 11 is connected, via the low-pass filter 13 (having a switchable cut-off frequency), to an input of a voltage-controlled oscillator 15 which has a nominal output frequency of 16 MHz. Thus, on the output line a (second) control clock pulse train CL is generated which has a frequency amounting to a multiple of the bit cell frequency (the nominal value of the latter is 500 kHz as has already been stated). The clock pulse series CL is applied to the pulse shaper circuit 5, the counter with connected decoder 17, and can also be externally output via a connection not shown. In the element 17, the pulse series received is divided by 16, the decoding section being suitable for generating each time a number of mutually phase shifted clock signals with a recurrent frequency of 1 MHz. For the possibly different clock pulse series, only the output DS for the data sample signal is shown. Thus, this signal has a recurrent frequency which amounts to twice the nominal bit cell frequency.

The data sample signal is applied first of all to the reset input R of the set/reset flipflop 2. The set input S of this flipflop receives the data signal DA.

As will yet be described, the data signal DA is present each time for only a brief period of time. The flipflop 2 then acts as a buffer. Simultaneously with the appearance of the signal DS, the flipflop 2 is each time reset, the information contained therein being taken over in the first stage of the shift register 19.

As will also be explained hereinafter, the data sample signal DS occurs in the synchronized condition each time briefly before the end of the first and the third quarter of a bit cell. All signal transitions of the data occurring at the beginning and at the centre of the bit cell, therefore, are correctly detected even in the case of the maximum permissible shift.

The synchronization information at the beginning of a sector stored on the medium commences with a predetermined number of bytes in an advantageous standardization, each byte having the value FF (11111111), so that a maximum number of signal transitions in this part is ensured. Subsequently, there is a special pattern of transitions in the magnetization which is not related to one of the permitted code words containing information. This special pattern can be unambiguously distinguished from the subsequent actual data information. Said pattern is, for example, 0100100010010001, a "1" each time signifying a transition in the bivalent condition of the medium (therefore, this differs from the coding of the data stated with reference to FIG. 1). In the synchronization information each time the data signal transitions occur, and hence also the data signal DA, each time with time intervals of one bit cell. Due to the double bit cell frequency of the data sample signal DS, the stages of the shift register 19 receive alternately the information "0" and "1". The output of the first stage of the shift register 19 is connected to a test circuit 21 which is adapted to detect said synchronization information.

In the preferred embodiment, the test circuit 21 comprises a small random access read/write memory. The data output thereof is connected to the input of a four-bit trigger circuit which is not separately shown. The outputs thereof form a part of the address signals of the latter memory. A further address part is formed by the data signal received. If the trigger circuit is set to zero by means of a signal on input RES, a start is made at the address 0 of the memory. If the first data bit and hence the last address location is correct, the memory outputs a word which indicates the next address at which the next data bit is tested. If a single data bit in the sequence is not correct, the memory reaches an address at which the starting address of the memory is output again. If all data bits were correct, the memory stops at the last address, i.e. the content of the last address is the last address again, and at the same time a "1" appears on a further output S of the memory only at this address line. The test circuit 21, which may also comprise a kind of sequential circuit other than a read/write memory, then assumes a termination state. This termination state is abandoned only under the control of a reset signal appearing on the input RES. This reset signal can be derived from every subsequent read control signal controlling the reading of an information sector. In said termination state, the element 21 supplies a "1" signal on the output line S: this signal indicates that the synchronization has been effected. It also controls the pulse shaper circuit 5, the clock pulse control circuit 7, and the lowpass filter 13, as will be explained hereinafter.

The output of every second stage of the shift register 19 is furthermore connected to an input of the switching device (parallel switch) 25. This switch is controlled by a signal on line 27. The latter signal is simply formed by an output signal of the counter 100 which has a counting capacity of 16 and which is clocked by the signal DS (or a similar signal from the element 17 which has been phase shifted slightly with respect thereto). The counter is enabled by the signal S which appears at the end of the starting ("mark") pattern. The output carry signal of the counter 100 is then generated exactly at the end of each subsequent 8-bit word.

Thus, the information signals are applied from the relevant outputs of the shift register 19 to the bus 29. In the case of 8-bit words, the shift register comprises exactly twice the number of stages (16) in view of the double sample frequency of the data sample signal DS. If the control signal of the lead 27 is so situated in the time that the information sampled at the beginning of the first bit cell of a data word on the record carrier has just reached the last stage of the shift register 19, the signals appearing in parallel on output 29 represent a complete data word read from the record carrier.

Figure 3:
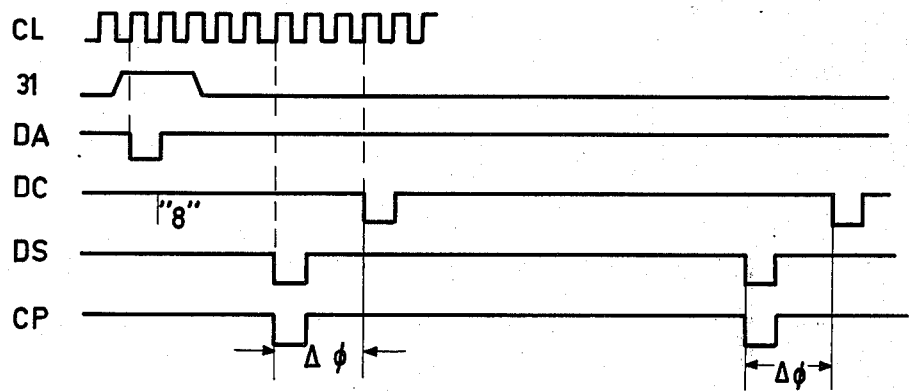
FIG. 3 shows a signal diagram in order to illustrate the generating of additional data clock signals.

FIG. 3 shows some signals occurring in the pulse shaper circuit 5. The first line shows the clock pulse series CL which continues in the indicated manner. The second line shows the signal supplied by the amplifier 31. The flipflop 33 is set by the first positive-going edge of the signal CL after the beginning of the signal from the amplifier 31. The third line of FIG. 3 shows the signal DA which appears on the inverted output Q of this flipflop. The data signal DA is applied to the elements 2 and 51, and inside the pulse shaper circuit itself also to the synchronous reset input R of a 16-counter 35 of the type 74163. The signal is also applied to the synchronous set input LD of a second 16-counter 39 (also type 74163). On the present inputs, the latter counter receives information representing the signal "8".

The next positive-going edge of the signal CL sets the counter 35 to the zero position and the counter 39 to the position "8", which is denoted by a vertical stroke on the fourth line in FIG. 3. The signal on the carry output Ca of the counter 35 thus changes, so that via the inverter 37 connected thereto the count enable input E is enabled and the counter 35 starts to count from the zero position in reaction to the clock pulse CL on the counting clock input CK until it reaches its highest position 15 in which the signal on the carry output Ca changes again and inhibits the further counting of the counter 35 via the inverter 37.

The signal from the carry output Ca is also applied to the reset input R of the D-flipflop 33 and resets this flipflop and keeps it reset during the counting of the counter 35. Because the counting period of the counter 35 is longer than the pulse duration of the read signal, multiple detection of a read signal pulse is precluded. Thus, the D-flipflop 33 is set only during a clock period of the clock pulse CL, and the data signal DA is correspondingly short.

As has already been described, at the end of the negative pulse of the data signal DA the counter 39 is set to the position "8", as denoted on the fourth line of FIG. 3. Because the switching signal on the line S is low during the synchronization operation, the NAND-gate 41 always generates on its output a high signal which is applied to the count enable input E of the counter 39, so that this counter continuously counts the pulses of the signal CL applied to the counting clock input CK. In the highest position 15, the counter 39 generates a signal on the carry output which, as a negative pulse, is output, via the inverter 43, as a read clock pulse train on the line DC.

The clock pulse control circuit 7 notably comprises two cross-coupled NAND-elements 51 and 53 and also an inverter 55 which is connected to the output of the logic element 53. Because the switching signal on the line S is low in the non-synchronized condition, the NAND-element 51 always generates a high signal on its output, so that the data sample signal applied to the NAND-element 53 via the line DS appears as a read clock pulse train in substantially unmodified form on the output of the inverter 55 on the line CP, as appears from the last two lines of FIG. 3. For this arbitrary situation in the time of the data sample signal DS, which is dependent of the relevant position of the clock generator 9 in FIG. 2 at the beginning of the synchronization, a phase shift $\Delta\phi$ arises between the two signals DC and CP applied to the phase comparator 11 in FIG. 2, said phase difference generating such a control signal for the voltage-controlled oscillator 15 on the output of the phase comparator 11, and hence on the output of the low-pass filter 13, that the frequency of the oscillator is increased and the phase difference is reduced. Because the signals DC and CP always have to be applied pairwise to the phase comparator, and because the latter signal is derived from the data sample signal DS having double the bit cell frequency, the counter 39 in FIG. 2 must circulate twice during each bit cell, so that when use is made of a 16-counter, for example, in the form of a 4-bit dual counter, the frequency of the clock pulse CL must be 32 times that of the bit cells.

Thus, during the synchronization operation a phase comparison is performed twice during each bit cell, the intervals of the two pulses of the signals DC, DS and CP shown in FIG. 3 not being dependent on the bit cell frequency determined by the instantaneous speed of the record carrier, i.e. on the intervals of the signals supplied by the amplifier 31, before successful synchronization, but only on the instantaneous frequency of the voltage-controlled oscillator 15; however, the phase shift and hence the correction signal of the phase comparator remains substantially the same. As a result of this fact succession of output signals of the phase comparator 11, the cut-off frequency of the low-pass filter 13 may be high, so that the voltage-controlled oscillator 15 can quickly react to the output signals of the phase comparator 11 and the synchronization operation is quickly performed.

Figure 4:
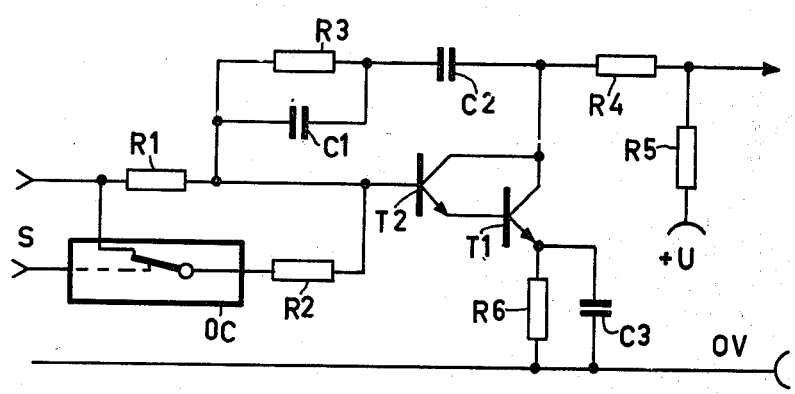
FIG. 4 shows the construction of a low-pass filter.

FIG. 4 shows an embodiment of a low-pass filter with a switchable cut-off frequency. The circuit comprises two transistors T1, T2 and also a resistor R1 (4300 ohms), a resistor R2 (2200 ohms), a resistor R3 (3300 ohms), a capacitor C1 (560 pF), a capacitor C2 (15 nF), a switch OC, and also resistors R4, R5, R6 and a capacitor C3, the proportioning of which is not critical. In this second-order low-pass filter, the transistors T1, T2 are connected as a Darlington amplifier. As a result of the low current gain, the voltage drop across the resistor R1 due to the base current of the transistor T2 remains comparatively small. The emitter of the transistor T1 is connected to OV, via an RC combination consisting of the resistor R6 and the parallel connected capacitor C3, having a high time constant, for setting a favourable working point. The collectors of the two transistors T1 and T2 are connected to a positive operating voltage via the series connection of the two resistors R4 and R5 in order to adjust on the junction of these two resistors, being connected to the control input of the voltage controlled oscillator, the level which is most favourable for the control of the oscillator.

The cut-off frequency of the filter is determined by the values of the resistors R1 to R3 and the capacitors C1 and C2 which are connected between the collector and the base of the transistor T2 or in the base lead thereof. The cut-off frequency is higher as the values of the elements are smaller. The resistor R2 is connected parallel to the resistor R1 by means of the switching device OC which results in a higher cut-off frequency. The switching device OC is actuated by the switching signal on the line S and thus an optical coupler for potential-free switching is realized. A suitable module can be chosen from the Texas Instruments series TIL 102 to TIL 109. The junction of the resistor R1 and the switching device OC receives the output signals of the phase comparator 11, i.e. in rapid succession during the synchronization operation, while the switch in the switching device OC is closed and the resistor R2 is connected parallel to the resistor R1 in order to obtain a high cut-off frequency. After successful synchronization, the switch in the switching device OC is opened and the cut-off frequency of the low-pass filter drops to an essentially lower value, so that the output signal thereof on the junction of the two resistors R4 and R5 follows the variation of the input signals only slowly.

Because the counter 39 in FIG. 2 is set to the position "8", i.e. to half the maximum position, for each data signal and because its circulation time amounts to one half bit cell length in the synchronized condition, the signals of the read clock pulse train appear on the line DC one quarter bit cell length after the data signal. However, because the clock generator 9 in FIG. 2 operates so that the read clock pulse train DC and the control clock pulse train CP, and hence the data sample signal DS, occur simultaneously, as has already been described, in the synchronized condition the data sample signal DS appears approximately one quarter bit cell length after the beginning and the centre of a bit cell.

The setting of the counter 39 in FIG. 2 to the position "8" for each data signal has an effect only during the synchronization operation when there still is a difference between the frequency of the data sample signal DS and the bit cell frequency. In the synchronized condition, however, there is a different procedure which will be described with reference to FIG. 5. The first line shows the data sample signal DS as a reference signal. Because this signal is shifted over a quarter bit cell with respect to the beginning or the centre of a bit cell, the nominal starting instant of a data signal is situated in the centre between two pulses of the data sample signal, and this point is indicated by a small vertical arrow. In the synchronized condition, moreover, the switching signal on the line S is high, so that when the counter 39 in FIG. 2 reaches its maximum position and produces a high signal on the carry output Ca, the output of the NAND-element 41 is low, with the result that the counting enable input E of the counter 39 is blocked, so that this maximum position is maintained and signal of the read clock pulse train on the line DC is low until a new data signal DA appears. Furthermore, because of the high signal on the line S, the two cross-connected NAND-elements 51 and 53 of FIG. 2 operate as a flipflop which is switched to the corresponding position in reaction to a negative pulse on the line DA or DS, this position being maintained also after termination of the corresponding negative pulse until a negative pulse arrives on the other line.

Figure 5:
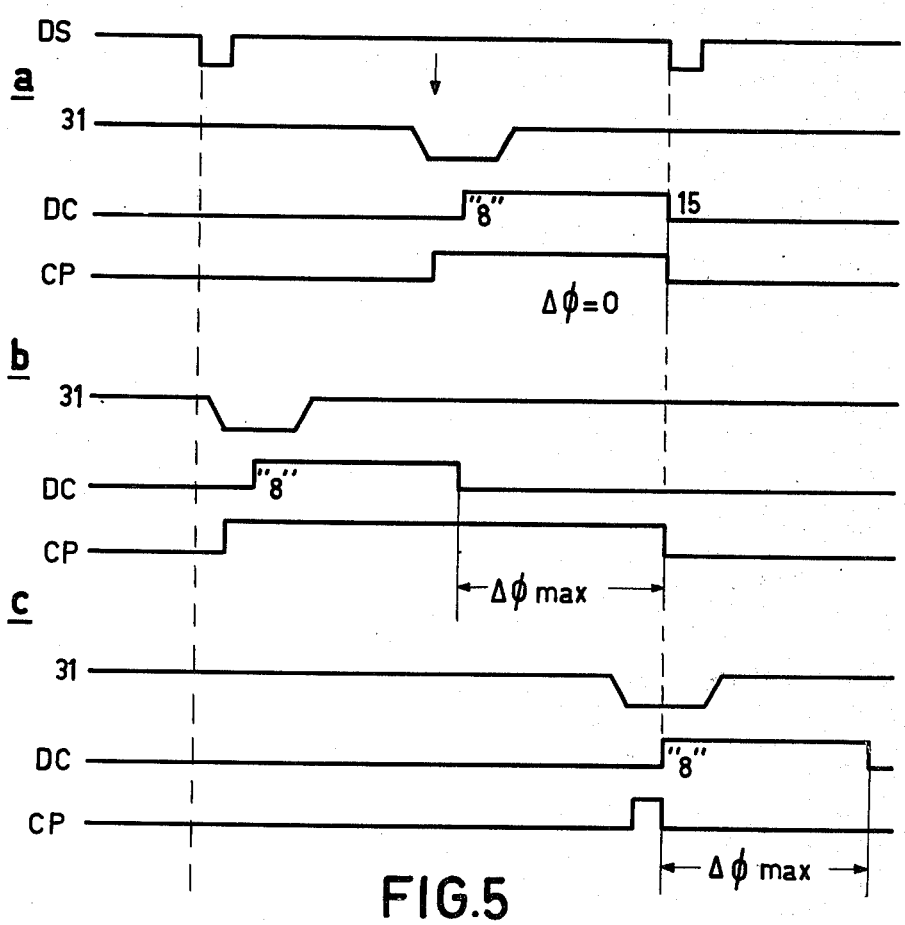
FIG. 5 shows a signal diagram in order to illustrate the phase control in the synchronized condition.

In section (a) of FIG. 5 it is assumed that the beginning of a data bit is situated briefly before the nominal instant, so that in reaction to the next positive signal of the clock pulse CL the flipflop 33 is switched over and produces a negative data signal pulse on the line DA. In reaction to this signal, the output of the NAND-element 51 in FIG. 2 becomes high, so that the output of the NAND-element 53 becomes low and the signal of the control clock pulse train CP becomes high as shown in FIG. 5(a). In reaction to the next positive-going edge of the clock pulse CL, the counter 39 is set to the position "8", so that via the NAND-element 41 the counting enable input E is enabled, with the result that the clock pulse CL is counted in the counter 39. The signal on the carry output Ca of the counter 39 being low, the signal of the read clock pulse train DC on the output of the inverter 43 also becomes high as shown in FIG. 5(a).

The counter 39 counts until it reaches its maximum position, a high signal then appearing again on the carry output Ca, said signal blocking the further counting and the switching the signal of the read clock pulse train DC to the low value again. As can be seen in FIG. 5(a), at the same time a negative pulse of the data sample signal DS starts, so that in FIG. 2 the output of the NAND-element 53 becomes high and hence the signal of the control clock pulse train CP becomes low. Thus, between the trailing edges of the two signals DC and CP the phase difference $\Delta\phi = 0$ exists, so that the phase comparator 11 in FIG. 1 does not supply an output signal and the voltage-controlled oscillator 15 is not readjusted.

For various reasons, the beginning of a data bit can now deviate approximately one quarter bit cell length, being half the distance between two data sample signals, from the nominal instant in both directions. In FIG. 5b it is assumed that the beginning of a data bit leads, so that at the end of the previous pulse of the data sample signal DS the flipflop 33 is already set and hence a data signal DA is generated which switches over the flipflop (51/53) in FIG. 2 again and generates a high signal of the control clock pulse train CP. In reaction to the next positive-going edge of the clock signal CL, the counter 39 is again set to the position "8", so that the signal of the read clock pulse train DC becomes positive. The counter 39, however, then reaches its maximum position in which the signal of the read clock pulse train DC becomes low again an essential period of time before the occurrence of the next pulse of the data sample signal DS by means of which the flipflop (51/53) in FIG. 2 is switched back and the signal of the control clock pulse train CP is made low again. Thus, between the trailing edges of the two signals DC and CP the maximum feasible phase difference $\Delta\phi_{max}$ which can still be handled occurs. On the output of the phase comparator 11 this phase difference produces a corresponding signal which as a single signal, however, increases the frequency of the voltage controlled oscillator 15 only little because of the low cut-off frequency of the low-pass filter 13, in order to reduce the phase difference, because in the border case the next data bit may be shifted over the maximum period with respect to the nominal instant.

In FIG. 5c such a shifted data bit from the amplifier 31 in FIG. 2 is assumed. In reaction to the next edge of the clock pulse CL, the flipflop 51/53 of FIG. 2 is switched over again and the signal of the control clock pulse train becomes high, but in reaction to the next edge of the clock pulse CL the negative pulse of the data sample signal DS already occurs, with the result that the flipflop of FIG. 3 is switched back again and the signal of the control clock pulse train becomes low. At the same time, the counter 39 is first set to the position "8" and reaches its maximum position only after seven pulses of the clock pulse CL, the signal of the read clock pulse train then becoming low again. This results in the maximum phase difference $\Delta\phi_{max}$, but in the other direction. The phase comparator 11 generates a signal in accordance with this phase difference, but this is a single signal and, because of the low cut-off frequency of the filter, it again has only a limited effect on the voltage-controlled oscillator 15, that is to say it only reduces the frequency.

Thus, a fast frequency and phase adaption of the voltage-controlled oscillator 15 is obtained during the synchronization operation, but only a slow variation of the frequency in the synchronized condition, even in the case of large additional deviations of the instant of appearance of the data bit with respect to the nominal instant.

What is claimed is:

1. In a device for synchronizing a clock pulse generator with a serial bivalent signal received from an external medium, which signal comprises a number of successive bit cells of nominally equal duration and has at least one transition in each series of a predetermined, fixed number of directly successive bit cells comprising:

oscillator means, having a control input and a control clock output, for producing a control clock pulse train under the influence of a signal on the control input;

clock extraction means, having a read clock output, for producing a read clock pulse train from the received signal;

phase comparator means, having a first input and a second input, connected for receiving said control clock pulse train and said read clock pulse train, and an output for supplying a phase difference signal which characterizes the phase difference between said pulse trains; and a low pass filter connected for receiving said phase difference signal and for forming therefrom a control signal which is connected to the control input of the oscillator means;

the improvement wherein said device further comprises:

test circuit means for determining whether or not the control clock pulse train is nominally synchronized with the received signal and for supplying a synchronization signal indicative thereof; and switching means which place the device in a first state by (1) causing the clock extraction means to produce a read clock pulse train which undergoes transitions at one-half bit cell intervals and connecting said read clock pulse train to the first input of the phase comparator means, causing the oscillator means to produce a control clock pulse train having twice the nominal bit cell frequency and connecting said control clock pulse train to the second input of the phase comparator means, and adjusting the low pass filter to a first cut-off frequency, when the synchronization signal indicates a lack of nominal synchronization between the control clock pulse train and the received signal; and which place the device in a second state by (2) causing the clock extraction means to produce a read clock pulse train which undergoes transitions at one bit cell intervals and connecting said read clock pulse train to the first input of the phase comparator means, causing the oscillator means to produce a control clock pulse train at the nominal bit cell frequency and connecting said control clock pulse train to the second input of the phase comparator means, and adjusting the low pass filter to a second cut-off frequency, which is lower than the first cut-off frequency, when the synchronization signal indicates that the control clock pulse train and the received signal are nominally synchronized.

2. The improvement of claim 1 wherein the oscillator means further supply a second control clock pulse train having a nominal frequency which is higher than twice the bit cell frequency and where the clock extraction means comprise a clock pulse input for receiving said second control clock pulse train and further function to form therefrom, in connection with the received signal, elements of a read clock pulse train which are delayed with respect to the received signal.

3. The improvement of claim 2 wherein the clock extraction means comprise a counter having a set input, connected to be controlled by signal transitions of the received signal, for forcing a starting position of the counter, a counting input connected to count the second clock pulse train, outputs which supply a first signal from the read clock pulse train before a predetermined maximum count is reached and is subsequently supply a second signal from the read clock pulse train, and blocking means which inhibit said counter after said predetermined maximum count whenever the device is in the second state.

4. The improvement of claim 1, 2 or 3 wherein the low pass filter includes an RC network having a first resistor, a second resistor, and means for connecting the second resistor into the RC network whenever the synchronization signal from the test circuit means indicates nominal synchronization.

5. The improvement of claim 4 wherein the means for connecting include an electro-optical switching element for connecting the second resistor.

* * * * *